June 19, 1928.
H. FLANSBURG
APPARATUS FOR EXCAVATING POSTHOLES
Filed Aug. 6, 1927
1,674,392
2 Sheets-Sheet 1
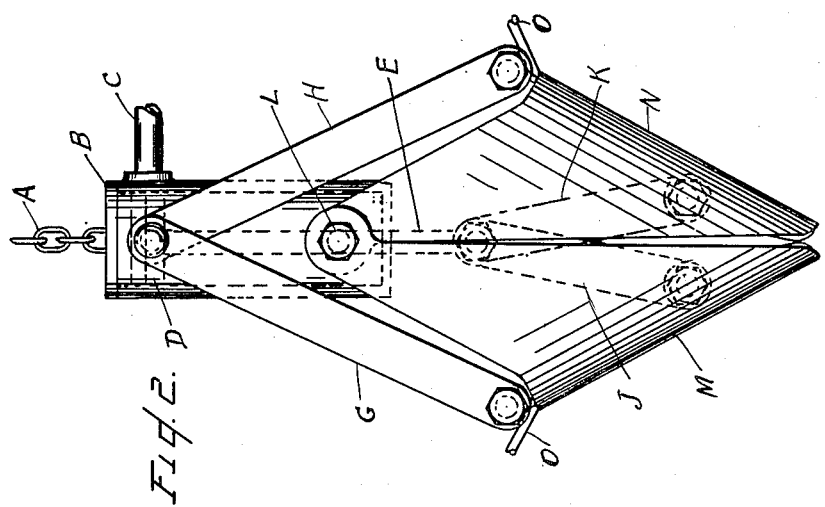
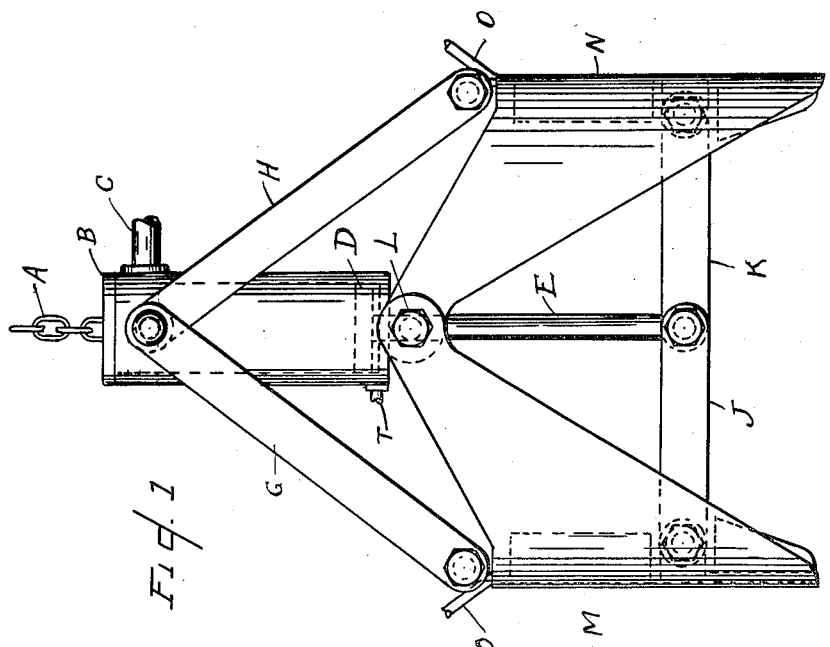
INVENTOR
Harold Flansburg
BY
Swan Frye and Murray
ATTORNEYS June 19, 1928.　　　　　　　　　　　　　　1,674,392
H. FLANSBURG
APPARATUS FOR EXCAVATING POSTHOLES
Filed Aug. 6, 1927　　　　　2 Sheets-Sheet 2

INVENTOR
Harold Flansburg
BY
Swan Frye and Murray
ATTORNEY

Patented June 19, 1928.

UNITED STATES PATENT OFFICE.

HAROLD FLANSBURG, OF SIBLEY, MICHIGAN.

APPARATUS FOR EXCAVATING POSTHOLES.

Application filed August 6, 1927. Serial No. 211,023.

This invention relates to means for excavating post holes and similar earth apertures of preferably limited and clean-cut contour, and has for its object an improved organization of parts by means of which a generally circular hole may be quickly and accurately dug with a minimum of displacement of the surrounding earth. A portion of the cooperating apparatus herein described embodies earth-removing scoops of the "clam shell" variety, appurtenant to each of whose blades is separately actuable earth-chopping mechanism, the preferred form of actuating means herein described being pneumatic in character. And while it has been my experience that separate chopping blades, as hereinafter described, are preferable, I desire it to be understood as fairly within the scope of my invention to apply the pneumatic, rapid-rate chopping movement directly to the blades or scoop members.

In the drawings:

Figure 1 is a side elevational view of my improved apparatus, showing the scoop or clam shell members in open position.

Figure 2 is a similar view showing the members in closed position.

From the chain or cable A is suspended a cylinder B, from which the air is adapted to be exhausted through the pipe C. Within the cylinder B engages the piston D, which carries the depending rod or stem E.

From the upper portion of the piston D on each side thereof are pivotally suspended a pair of links, as G and H, and with the lower end of the stem E are similarly connected a pair of links J and K. The lower or outer ends of these links are pivotally connected with the upper and lower portions respectively of the scoop or clam shell members M and N, which are in turn pivotally connected, as at L, at their attenuated upper ends. As the stem E is drawn up by the action of the piston D, these scoop members M and N are drawn upwardly and inwardly by the action of their link members G and H and J and K to the position shown in Figure 2.

Supported on the inner and concave face of each of the scoop members M and N is a pneumatic driver apparatus, as P, whose stem Q slidably engages through guides R; compressed air is furnished to each of the pneumatic elements P through the pipes O. On the lower end of each stem Q is supported a cutting blade or shovel piece, S, which is thus adapted to be rapidly moved upwardly and downwardly, through a relatively limited range, by the action of the stem Q of the pneumatic hammer member P.

Figure 4:
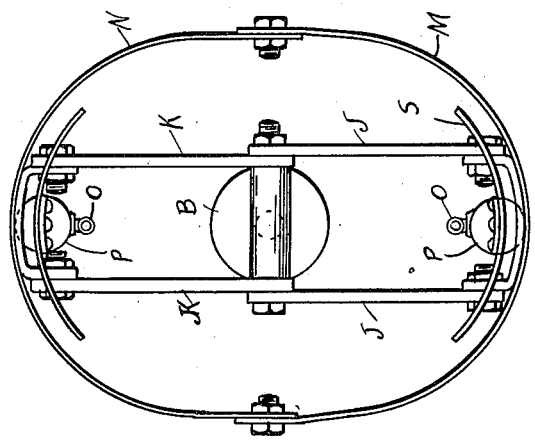
Figure 4 is a plan view of the apparatus taken from beneath.
Figure 3:
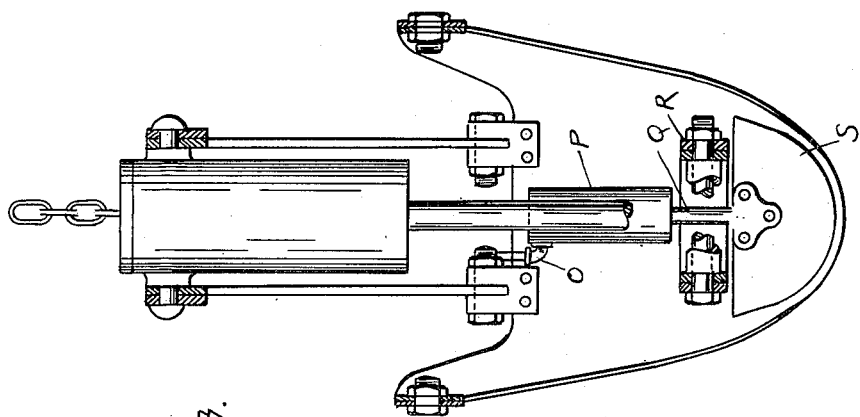
Figure 3 is an elevational view of the interior face of one of the scoop members and its connected parts, taken from a position at right angles from the showing in Figures 1 and 2.

For the cutting of a post hole whose contour is desired to be relatively uniform and smooth, the apparatus is lowered over the selected location, with its scoop members M and N in the open position shown in Figure 1. The pneumatically-actuated cutting members on each blade (or the blades themselves in case of the structural modification previously suggested) are then started in action, and the scoop blades allowed to gradually drop and follow the course made available to them through the loosening of the earth by the choppers S. When a sufficient amount of earth has been loosened to somewhat more than fill the space enclosed by the scoop members M and N when they are in closed or indrawn position, the piston D is caused to rise by suction through the pipe C, and, thanks to the pivoting of the upper ends of the scoop members at L and the action of the two sets of links G and H and J and K, one of each of which is on each side of the apparatus, as brought out in Figures 3 and 4, the indrawing of the scoop members M and N to the position shown in Figure 2 proceeds, and by suitable lift upon the supporting chain or cable A, the now filled bucket members may be lifted to a position over a wagon or other selected position for emptying the scoop members, the outward projection of which is effected by the induced downward travel of the piston B.

It is, of course, obvious that in place of a vacuum influence for drawing the piston D upwardly, a compressed air pressure upon the under side of the piston could be easily substituted without departure from the fair spirit of my invention. I have indicated such a pipe at T in Figure 1. In case the cylinder is provided with both pipes, C and T, the action of both, in proper sequence, will often be found advisable to counteract possible sticking of the piston D at some point along its possible path of travel within the cylinder B.

What I claim is:

1. A post hole excavating mechanism, having in combination with a pair of pivotally correlated scoop members, a cylinder provided with a piston and a depending stem with which said scoop members are operatively connected, means for regulably supplying pneumatic actuation to the piston for effecting the upward and downward movement thereof, thereby causing the movement of said scoop members to closed and open positions respectively, and pneumatically actuated means appurtenant to each of said scoop members whereby the earth lying substantially in the same vertical plane as said scoop members may be loosened for subsequent engagement within and removal by said scoop members.

2. In combination with a supporting cylinder provided with a piston and an outwardly extending stem, pneumatic means for regulably actuating said piston lengthwise of said cylinder, a pair of scoop members pivotally connected with one another, a plurality of pairs of correlating and supporting links pivotally connected respectively with said cylinder, and with the stem of the piston and with said scoop members, whereby the opening and closing movement of said scoop members may be regulated, and a pneumatically-actuated cutter member carried by each of said scoop members in position to loosen the earth adjacent the planes of each when in extended position, whereby the earth mass enclosed between them when in open position may be loosened preparatory to its envelopment and removal by the actuated movement of said scoop members.

3. In combination with a pneumatically actuable cylinder and piston member, a pair of cooperable scoop members operatively connected therewith and with the projecting stem of the piston, and pneumatically operable earth-cutting members supported by each of said scoop members in position to act upon the earth in planes closely approximating those of their respective scoop members.

4. The combination, with a cylinder and piston, the latter provided with a stem projecting through one end wall of the cylinder, of pneumatic means for effecting the regulated movement of said piston and its stem relatively to said cylinder, a pair of scoop members pivotally connected with one another, link members operatively connecting said scoop members, said cylinder, and the projecting end of said piston stem, and a pneumatically actuable cutter member positioned on the blade of each of said scoop members in position to loosen the earth for removal by said scoop members when drawn to closed position.

5. The combination, with a pendently supported cylinder, provided with a piston and an externally projecting piston stem, of a pair of scoop members pivotally connected with one another, a plurality of pairs of link members operatively connecting said scoop member with said cylinder and with the projecting end of the piston stem, pneumatic means for actuating said piston thereby effecting the movement of said scoop members to open and closed position, and pneumatically actuable cutter members carried by said scoop members in position to loosen the earth adjacent the path of descending movement of said scoop members.

6. In combination with a pendent cylinder and a piston adapted to be pneumatically actuated lengthwise thereof, a plurality of pairs of link members connected respectively with the cylinder and with the projecting stem of the piston, pivotally correlated scoop members with which the end portions of said link members are operatively connected for movement to closed and open position, and pneumatically operable means appurtenant to each of said scoop members whereby the adjacent earth may be loosened for subsequent removal by said scoop members when drawn to closed position.

In witness whereof I hereunto set my hand.

HAROLD FLANSBURG.